(12) United States Patent
Bojarski et al.

(10) Patent No.: US 12,084,542 B2
(45) Date of Patent: Sep. 10, 2024

(54) POLYCARBONATE COMPOSITIONS WITH IMPROVED OXIDATION STABILITY AND METHODS OF MANUFACTURING THE SAME

(71) Applicant: SABIC Global Technologies, B.V., Bergen op Zoom (NL)

(72) Inventors: Aaron David Bojarski, Murcia (ES); Ignacio Vic Fernandez, Murcia (ES)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 659 days.

(21) Appl. No.: 17/297,670

(22) PCT Filed: Dec. 5, 2019

(86) PCT No.: PCT/IB2019/060494
§ 371 (c)(1),
(2) Date: May 27, 2021

(87) PCT Pub. No.: WO2020/115707
PCT Pub. Date: Jun. 11, 2020

(65) Prior Publication Data
US 2022/0041806 A1 Feb. 10, 2022

(30) Foreign Application Priority Data
Dec. 5, 2018 (EP) .................................. 18382900

(51) Int. Cl.
C08G 64/06 (2006.01)
C08G 64/30 (2006.01)
(52) U.S. Cl.
CPC ........... C08G 64/307 (2013.01); C08G 64/06 (2013.01)
(58) Field of Classification Search
USPC ....................................................... 528/198
See application file for complete search history.

(56) References Cited

U.S. PATENT DOCUMENTS

| | | | |
|---|---|---|---|
| 4,240,968 A | 12/1980 | Quinn et al. | |
| 6,410,678 B1 | 6/2002 | Ishida et al. | |
| 6,750,314 B2 | 6/2004 | Miyamoto et al. | |
| 7,371,902 B2 | 5/2008 | Kumar et al. | |
| 2017/0015782 A1 | 1/2017 | Watanabe | |

FOREIGN PATENT DOCUMENTS

| | | |
|---|---|---|
| GB | 1565667 A | 4/1980 |
| JP | 2008239650 A | 10/2008 |
| WO | 2006049955 A1 | 5/2006 |
| WO | 2011120921 A1 | 10/2011 |
| WO | 2013027165 A1 | 2/2013 |
| WO | 2013175448 A1 | 11/2013 |
| WO | 2014072923 A1 | 5/2014 |
| WO | 2015129640 A1 | 9/2015 |
| WO | 2018134734 A1 | 7/2018 |

OTHER PUBLICATIONS

JP2008519096A Machine Translation (Year: 2008).*
International Search Report; International Application No. PCT/IB2019/060494; International Filing Date: Dec. 5, 2019; Date of Mailing: Mar. 10, 2020; 5 pages.
Written Opinion; International Application No. PCT/IB2019/060494; International Filing Date: Dec. 5, 2019; Date of Mailing: Mar. 10, 2020; 7 pages.

* cited by examiner

*Primary Examiner* — Terressa Boykin
(74) *Attorney, Agent, or Firm* — CANTOR COLBURN LLP

(57) ABSTRACT

A method of preparing a polycarbonate composition in a polymerization system that includes a monomer mixing unit, an oligomerization section, and a polymerization section. The method includes melt polymerizing a dihydroxy compound with a diaryl carbonate compound in the presence of a quaternary phosphonium catalyst to produce the polycarbonate composition having a phosphorus-containing byproduct of at least one of the quaternary phosphonium catalyst or of the diaryl carbonate compound. The method further includes recycling the phosphorus-containing byproduct into the monomer mixing unit of the polymerization system and removing the polycarbonate composition from the polymerization system. The recycle stream has a phosphorus concentration of greater than or equal to 40 parts per million by weight.

21 Claims, 5 Drawing Sheets

POLYCARBONATE COMPOSITIONS WITH IMPROVED OXIDATION STABILITY AND METHODS OF MANUFACTURING THE SAME

CROSS REFERENCE TO RELATED APPLICATION

The present application is a national stage filing of PCT/IB2019/060494 that was filed Dec. 5, 2019, which claims priority to EP Application No. 18382900.1 that was filed Dec. 5, 2018 and to U.S. Patent Application No. 62/788,202 that was filed Jan. 4, 2019. The related applications are incorporated herein by reference in their entirety.

BACKGROUND

Polycarbonates are useful in the manufacture of articles and components for a wide range of applications, such as automotive parts, electronic appliances, plastic optical recording medium, and optical lenses. Polycarbonates exhibit excellent mechanical properties such as impact resistance, heat resistance and transparency. Polycarbonates, however, are susceptible to oxidation, and thereby are known to color with time and with application of heat.

Polycarbonates can be made by melt polymerizing a dihydroxy compound and a carbonate compound in the presence of a catalyst. It has been observed that when organic quaternary phosphonium compounds (e.g. tetrabutyl phosphonium acetate (TBPA)) are used as a catalyst during melt polymerization process, the obtained polycarbonate is less labile to oxidation reactions.

WO 2018/134734 is directed to a method of preparing a polycarbonate composition, including: melt polymerizing in a polymerization unit a dihydroxy compound with a diaryl carbonate and removing a stream of color inducing species containing an isopropenyl phenyl-containing group from the polymerization unit, to form a polycarbonate composition, wherein the polycarbonate has a color inducing species containing an isopropenyl phenyl-containing group level below 170 parts per million by weight (ppm).

WO 2006/049955 is directed to a method of making polycarbonate comprises melt-polymerizing an aromatic dihydroxy compound and a carbonic acid diester in a presence of a polymerization catalyst in a reactor system producing a byproduct stream, wherein the polymerization catalyst comprises a quaternary phosphonium compound; and purifying the byproduct stream to separate the carbonic acid diester, wherein the separated carbonic acid diester has a phosphorous concentration of less than or equal to 30 ppm.

Accordingly, there remains a need for polycarbonate compositions and methods of manufacturing the same that provide for improved oxidation stability, while not effecting other useful qualities of polycarbonate compositions.

BRIEF SUMMARY

Disclosed herein are the polycarbonate compositions with improved oxidation stability and method of preparing the same.

A method of preparing a polycarbonate composition in a polymerization system is disclosed. The polymerization system includes a monomer mixing unit, an oligomerization section, and a polymerization section. The method comprises melt polymerizing a dihydroxy compound with a diaryl carbonate compound in the presence of a quaternary phosphonium catalyst to produce the polycarbonate composition having a phosphorus-containing byproduct of at least one of the quaternary phosphonium catalyst or of the diaryl carbonate compound. The method further includes recycling the phosphorus containing byproduct into the monomer mixing unit of the polymerization system and removing the polycarbonate composition from the polymerization system. The recycle stream has a phosphorus concentration of greater than or equal to 40 parts per million by weight (ppm), or greater than or equal to 50 ppm, for example, 40 to 500 ppm, preferably 50 to 250 ppm, or 50 to 150 ppm.

A method of preparing a polycarbonate composition in a polymerization system can comprise: melt polymerizing a dihydroxy compound with a diaryl carbonate compound in the presence of a quaternary phosphonium catalyst; recycling phosphorus-containing byproduct into the polymerization system; and wherein the recycle stream has a phosphorus-containing byproduct concentration of greater than or equal to 280 ppm, preferably greater than or equal to 350 ppm, such as 280 ppm to 3,500 ppm, or 280 to 1,750 ppm; and wherein the phosphorus-containing byproduct comprises phosphate ester of formula:

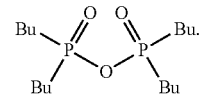

Also disclosed herein is a polycarbonate composition prepared by the method described above.

The above described and other features are exemplified by the following drawings, detailed description, examples, and claims.

BRIEF DESCRIPTION OF THE DRAWINGS

Refer now to the figures, which are exemplary embodiments, and wherein the like elements are numbered alike.

DETAILED DESCRIPTION

Figure 1:
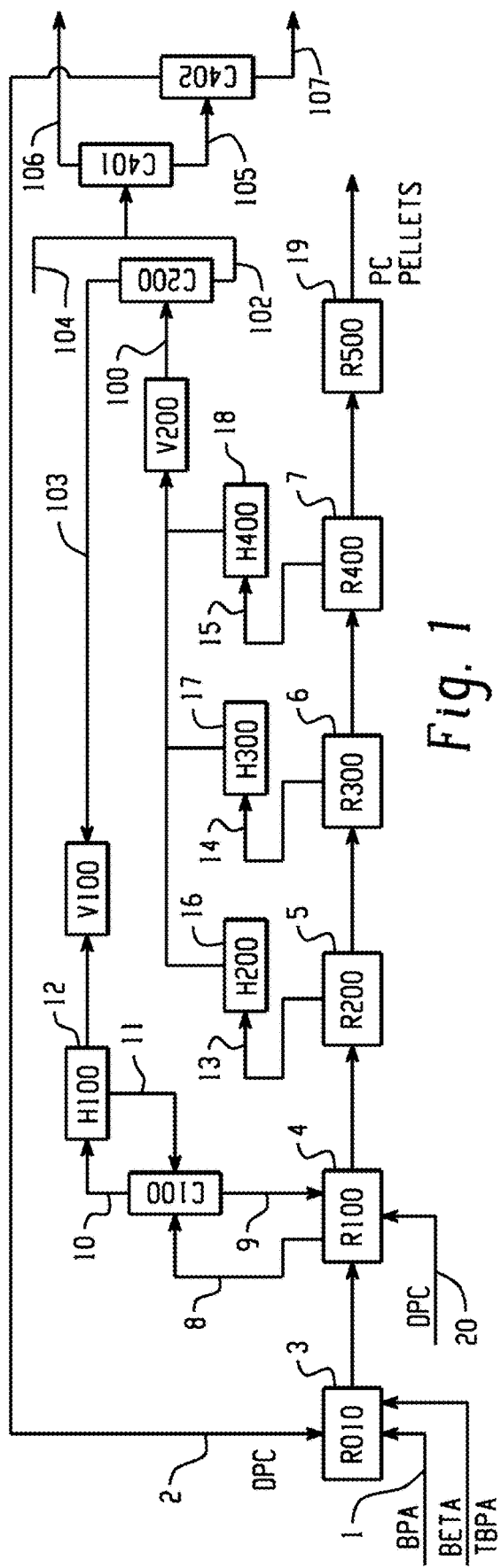
FIG. 1 is an illustration of a polymerization system according to Example 1.

Embodiments of the invention are directed to a method of preparing a polycarbonate composition in a polymerization system. The polymerization system includes a monomer mixing unit, an oligomerization section, and a polymerization section. The method comprises melt polymerizing a dihydroxy compound with a diaryl carbonate compound in the presence of a quaternary phosphonium catalyst to produce the polycarbonate composition having a phosphorus-containing byproduct of at least one of the quaternary phosphonium catalyst or of the diaryl carbonate compound. The method further includes recycling the phosphorus containing byproduct into the monomer mixing unit of the polymerization system and removing the polycarbonate composition from the polymerization system. The polycarbonate composition exiting the polymerization system has a phosphorus concentration 2-10 ppm.

The melt polycarbonate process is based on the reaction of a dihydroxy compound and a carbonate precursor in a molten stage. As further described herein, the reaction can occur in a series of reactors where the combined effect of the catalyst, temperature, vacuum, and agitation allows for monomer reaction and removal of reaction by-products to displace the reaction equilibrium and make the polymer chain grow. A common polycarbonate that is made by melt polymerization reactions is that derived from bisphenol A (BPA) via reaction with diphenyl carbonate (DPC). This reaction can be catalyzed by a quaternary catalyst, such as quaternary phosphonium catalyst, e.g., tetrabutyl phosphonium acetate (TBPA).

More specifically, the method disclosed herein includes melt polymerizing in a polymerization system a dihydroxy compound of formula (I)

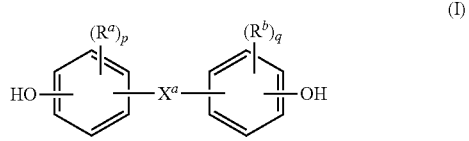

(I)

wherein $R^a$ and $R^b$ are each independently a halogen, $C_{1-12}$ alkoxy, or $C_{1-12}$ alkyl; p and q are each independently integers of 0 to 4; $X^a$ is a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group;

with a diaryl carbonate compound of formula (A)

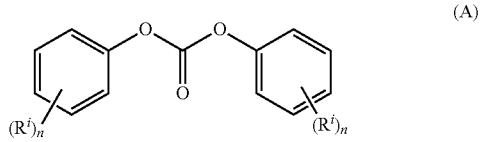

(A)

wherein each n is independently an integer of 1 to 3 and each R' is independently a linear or branched, optionally substituted $C_{1-34}$ alkyl, $C_{1-34}$ alkoxy, $C_{5-34}$ cycloalkyl, $C_{7-34}$ alkylaryl, $C_{6-34}$ aryl, a halogen radical, or —C(=O)OR' wherein R' is H, linear or branched $C_{1-34}$ alkyl, $C_{1-34}$ alkoxy, $C_{5-34}$ cycloalkyl, $C_{7-34}$ alkylaryl, or $C_{6-34}$ aryl.

The polymerization process can be carried out in the presence of TBPA.

It has been observed that when TBPA is used in the polycarbonate production process, along the process, tributyl phosphine oxide (TBPO) and other phosphate esters are produced. For example, in addition to TBPO, the following nonionic compound of formula (II) was identified:

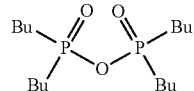

(II)

Accordingly, the use of TBPA in the polycarbonate production results in the production of TBPO and phosphate esters, thereby providing for a higher phosphorus (P) concentration and the resulting polycarbonate product that is less labile to oxidation reactions. TBPO is volatile and can be vaporized under the conditions of the polymerization reaction, aiding to its separation during the polymerization process. During the process, because TBPO has a similar vapor pressure as DPC, a significant amount of the TBPO can be distilled with DPC. Consequently, it has been determined that TBPO and related phosphate esters produced by the polymerization reaction can be recycled into the process with recovered DPC through a recycle loop. It has been surprisingly further observed that incremental amounts of TBPA render higher contents of TBPO and related phosphate esters being produced.

Desirably, the recycle stream (e.g., the phosphorus-containing byproduct into the monomer mixing unit of the polymerization system, such as recycled DPC) has a phosphorous content of greater than or equal to 40 ppm, or greater than or equal to 50 ppm, such as 40 to 500 ppm, or 40 to 250 ppm, or 50 to 250 ppm, preferably 50 to 150 ppm, or 50 to 100 ppm, and yet or 50 to 70 ppm.

The "cookie test" was employed to determine the oxidation stability of the polycarbonate prepared by the methods described herein. The test includes heating 50 g of polycarbonate pellets at a temperature of 250° C. for 2 hours in air. The resulting plaque from the "cookie test" is used for color measurement.

It has also been observed that unwanted color inducing species are recycled into the process via the recycle loop with DPC, TBPO and phosphate esters and result in the polycarbonate having undesirable content of the color inducing species. The initial color and the color after aging of polycarbonates is affected by the amount of color inducing species present. For example, the color inducing species can be isopropenyl group-containing compounds or 9,9 dimethyl xanthone (DMX). Accordingly, lower content of the color inducing species is associated with lower coloration in the polycarbonate, and therefore is desirable. Color values (lightness (L*), red/magenta and green (a*), yellow/blue (b*) and Yellowness Index (YI)) are calculated from the absorption spectrum of a plaque (cookie) between 360 nanometers (nm) and 750 nm. The spectrum is measured on a Macbeth 7000A device in transmission mode and UV included. The L*, a*, b* and YI values have been calculated according the ASTM D1925 method. The inventors have discovered operational changes in the polymerization method as described herein that allows production of polycarbonates having lowered concentration of color inducing species and increased the desirable content of TBPO and related phosphate esters produced (i.e., the P content).

The polycarbonate composition prepared by the method described herein may include from greater than or equal to 1 ppm, or greater than or equal to 7 ppm, or greater than or equal to 14 ppm, preferably, greater than or equal to 28 ppm, (e.g., 1 to 30 ppm) of tributyl TBPO and other phosphate esters, for example, the compound of formula (II)

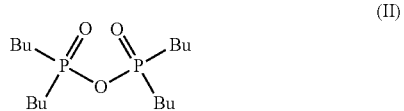

TBPO (weight average molecular weight (Mw):218.32 g/mol) and TBPA (Mw: 318.47 g/mol) contents are determined based on the phosphorus content associated with those species. In other words, 1 ppm of elemental P measured represent: 7.0 ppm of TBPO or 10.3 ppm of TBPA.

"Polycarbonate" as used herein means a polymer or copolymer having repeating structural carbonate units of formula (1)

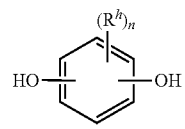

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (2) or a bisphenol of formula (3).

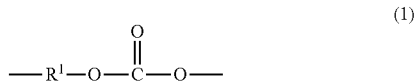

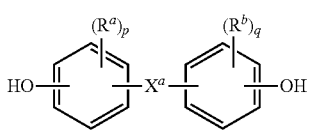

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an aspect, p and q is each 0, or p and q is each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Examples of bisphenol compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute. The polycarbonate has flow properties useful for the manufacture of thin articles. Melt volume flow rate (often abbreviated MVR) measures the rate of extrusion of a thermoplastic through an orifice at a prescribed temperature and load. Polycarbonates useful for the formation of thin articles can have an MVR, measured at 300° C./1.2 kg, of 50 to 1 cubic centimeters per 10 minutes (cc/10 min), specifically 30 to 3 cc/10 min. Combinations of polycarbonates of different flow properties can be used to achieve the overall desired flow property.

"Polycarbonates" includes homopolycarbonates (wherein each $R^1$ in the polymer is the same), copolymers comprising different $R^1$ moieties in the carbonate ("copolycarbonates"), and copolymers comprising carbonate units and other types of polymer units, such as ester units or siloxane units. The polycarbonate can be homopolycarbonate. Optionally, the polycarbonate can be a copolymer.

In the melt polymerization method, the polycarbonate can be prepared by reacting, in a molten state, the dihydroxy compound and the carbonate precursor in the presence of catalysts. The reaction can be carried out in typical polymerization equipment, such as a continuously stirred reactor (CSTR), plug flow reactor, wire wetting fall polymerizers, free fall polymerizers, horizontal polymerizers, wiped film polymerizers, BANBURY mixers, single or twin screw extruders, or a combination comprising one or more of the foregoing. Volatile monohydric phenol is removed from the molten reactants by distillation and the polymer is isolated as a molten residue. Melt polymerization can be conducted as a batch process. Optionally, the melt polymerization can be conducted as a continuous process. It is noted that the melt polymerization can be conducted as a combination of batch and continuous processes in different sections of the polymerization plant. In each case, the melt polymerization conditions used can comprise two or more distinct reaction stages.

For example, the polymerization can comprise an oligomerization stage in which the starting dihydroxy compound and a carbonate precursor such as a diaryl carbonate are converted into an oligomeric polycarbonate and a second reaction stage also referred to as a polymerization stage wherein the oligomeric polycarbonate formed in the oligomerization stage is converted to high molecular weight polycarbonate. The oligomerization stage can comprise 1 or more, or 2 or more, or 2 to 4 oligomerization units (for example, 2 to 4 continuously stirred tanks). When 2 or more oligomerization units are present in series, one or both of an increase in temperature and a decrease in pressure can occur from one unit to the next. The polymerization stage can comprise 1 or more, or 2 or more, or 2 polymerization units (for example, 2 horizontal or wire wetting fall polymerizers). The polymerization stage can comprise one or more polymerization units that can polymerize the polycarbonate to a number average molecular weight (Mn) using a polycarbonate standard of, for example, 20,000 to 50,000 Daltons. After formation of a polycarbonate, the polycarbonate composition can then be optionally quenched and devolatilized in a devolatization unit, where the Mn of the polycarbonate does not significantly increase (for example, the Mn does not increase by greater than 10 weight percent (wt %)) and a temperature, a pressure, and a residence time are used to reduce the concentration of low Mn components (such as those with an Mn of less than 1,000 Daltons). The oligomerization unit is herein defined as an oligomerization unit that results in polycarbonates oligomers with an Mn of less than or equal to 8,000 Daltons and a polymerization unit is herein defined as a polymerization unit that produces polycarbonate with a number average molecular weight (Mn) of greater than 8,000 Daltons. It is noted that while less than or equal to 8,000 Daltons is used here to define a molecular weight achieved in the oligomerization stage, one skilled in the art readily understands that said molecular weight is used to define an oligomerization stage, where the oligomer molecular weight could be greater than 8,000 Daltons. A "staged" polymerization reaction condition can be used in continuous polymerization systems, wherein the starting monomers are oligomerized in a first reaction unit and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of 1,000 to 7,500 Daltons. In one or more subsequent polymerization stages the number average molecular weight of the polycarbonate can be increased to, for example, 8,000 and 25,000 Daltons (using polycarbonate standard), or 13,000 to 18,000 Daltons.

Typically, solvents are not used in the process, and the reactants, the dihydroxy compound, and the carbonate precursor are in a molten state. The reaction temperature can be 100 to 350 degrees Celsius (° C.), or 180 to 310° C. The pressure can be at atmospheric pressure, supra-atmospheric pressure, or a range of pressures from atmospheric pressure to 15 torr in the initial stages of the reaction, and at a reduced pressure at later stages, for example, 0.2 to 15 torr. Likewise, the polymerization can occur in a series of polymerization units that can each individually have increasing temperature and/or vacuum. For example, an oligomerization stage can occur at a temperature of 100 to 280° C., or 140 to 240° C. and a polymerization stage can occur at a temperature of 240 to 350° C., or 280 to 300° C., or 240 to 270° C., or 250 to 310° C., where the temperature in the polymerization stage is greater than the temperature in the oligomerization stage. The reaction time from the initial oligomerization unit to the final polymerization unit is generally 0.1 to 15 hours (hr). A final polymerization unit as used herein refers to a final polymerization unit in the melt polymerization where the last increase in molecular weight occurs. For example, the quenching agent can be added to the polycarbonate resin after a final polymerization unit (e.g., after a point where the weight average molecular weight based on polystyrene standard (Mw) of the polycarbonate resin will increase by less than or equal to 10%), and optionally, before any melt filtering.

Likewise, an oligomerization can occur at a pressure of greater than or equal to 10 kiloPascals absolute (kPa(a)) or the oligomerization can comprise at least two oligomerization units where a first oligomerization unit can have a pressure of greater than or equal to 10 kPa(a) and a second oligomerization can have a pressure of 1.5 to 9 kPa(a), where the first oligomerization unit is upstream of the second oligomerization unit, where one or more oligomerization units can be located before, in between, or after said polymerization units.

The polymerization stage following the oligomerization stage can comprise polymerizing in one or two polymerization units. The first polymerization unit can be at a temperature of 240 to 350° C., or 260 to 310° C. and a pressure of 0.1 to 1 kPa(a). The second polymerization unit can be at a temperature of 240 to 350° C., or 260 to 300° C. and a pressure of less than or equal to 0.5 kPa(a). The polycarbonate can be devolatized after a final polymerization. A final polymerization as used herein refers to the polymerization where the last increase in molecular weight occurs.

For example, after the final polymerization, the Mw of the polycarbonate increases by less than or equal to 10%.

After a final polymerization unit, the polymer can be introduced to a reactor, extruded, subjected to filtration in a melt filter, or a combination comprising one or more of the foregoing. It is noted that the melt filter can be located before or after the extruder. For example, the melt polymerization process for the manufacture of a polycarbonate composition can comprise: melt polymerizing a dihydroxy compound and a carbonate precursor to produce a molten reaction product; quenching the molten reaction product; filtering the molten reaction product in a melt filter upstream of any extruders; optionally, introducing an additive to form a mixture; and extruding the mixture to form the polycarbonate composition. Likewise, the melt polymerization process for the manufacture of a polycarbonate composition can comprise: melt polymerizing a polycarbonate; introducing a quencher composition and optionally an additive to form a mixture; and extruding the mixture to form the polycarbonate composition.

The polycarbonate can be, for example, a bisphenol A polycarbonate with a Mw based on a polystyrene standard of 21,800 Daltons with a melt flow of 24 to 32 grams per 10 minutes (g/10 min) (ASTM D1238-04, 300° C., 2.16 kilogram (kg)).

The polycarbonate can have a melt flow of 4 to 40 g/10 min, for example, 4.5 to 15 g/10 min or 15 to 35 g/10 min as determined by ASTM D1238-04 at 300° C., 1.5 kg. The polycarbonate can have a melt flow of 5 to 15 g/10 min as determined by ASTM D1238-04 at 250° C., 1.5 kg.

Catalysts used in the melt transesterification polymerization production of polycarbonates can include an alpha catalyst and a beta catalyst. Alpha catalysts can comprise a source of alkali or alkaline earth ions and are typically more thermally stable and less volatile than beta catalysts.

The ionic catalyst comprises a compound of the formula (4)

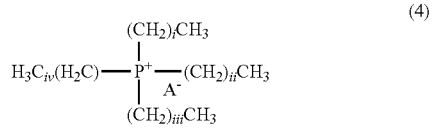

wherein i+ii+iii+iv is greater than or equal to 16, or 16 to 50, or 20 to 35 and wherein i is greater than or equal to ii+2, or greater than or equal to ii+5, or greater than or equal to ii+8, or greater than or equal to ii+2 and less than or equal to ii+20. In formula 4, i can be 8 to 20, or 8 to 12. In formula 4, ii can be 6 to 10. In formula 4, ii, iii, and iv can be the same or different; or ii and iii can be the same and i and iv can be the same. In formula I, i can be equal to iv and ii can be equal to iii. In formula 4, iii and iv can be equal to i.

The anion $A^-$ can comprise, for example, a halide (such as chorine or bromine), a hydroxide, an alkyl, an aryl, a dialkyl, a phosphate (such as a fluorophosphate), a phosphinate (such as an alkyl phosphinate), an alkyl tosylate, a cyanamide, an alkyl sulfate, an amide group, a carboxylate, a sulphate, a borate, an alkyl ester, or a combination comprising at least one of the foregoing. The anion can include tetrafluoroborate, dicyanamide, bis(trifluoromethanesulfonyl)amide, tosylate, carboxylate, phosphinate, dialkylphosphate, alkylsulfate, hexafluorophosphate, bis(2,4,4-trimethylpentyl) phosphinate, acetate, hydroxide, benzoate, formate, propionate, butyrate, phenolate, bistriflimide, phenoxide, or a combination comprising at least one of the foregoing. The ionic catalyst can comprise a tributyl hexadecyl phosphonium catalyst, a trihexyl butyl phosphonium catalyst, a trihexyl tetradecyl phosphonium catalyst, a tetraoctyl phosphonium catalyst, a tetradecyl trihexyl phosphonium catalyst, or a combination comprising at least one of the foregoing. The ionic catalyst can comprise a trihexyl tetradecyl phosphonium such as trihexyl tetradecyl phosphonium tetradecanoate (TDPD), trihexyl tetradecyl phosphonium 2,4,4-trimethylpentyl phosphinate (TDPP), or a combination comprising at least one of the foregoing.

The amount of the ionic catalyst can be added based upon the total number of moles of dihydroxy compound employed in the polymerization reaction. When referring to the ratio of the ionic catalyst to all dihydroxy compounds employed in the polymerization reaction, it is convenient to refer to moles of the ionic catalyst per mole of the dihydroxy compound(s), meaning the number of moles of the ionic catalyst divided by the sum of the moles of each individual dihydroxy compound present in the reaction mixture. The amount of the ionic catalyst can be employed in an amount of 1 to 80, or 2 to 50, or 3 to 12, or 5 to 9 micromoles per total mole of the dihydroxy compound.

The ionic catalyst can be an ionic liquid, for example, comprising the ions in a liquid state. In some instances, the ionic liquid will not decompose or vaporize when melted.

The beta catalyst can comprise a quaternary catalyst. The quaternary catalyst comprises a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and $X^-$ is an organic or inorganic anion, for example, a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing.

The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and $X^-$ is an organic or inorganic anion, for example, a hydroxide, phenoxide, halide, carboxylate such as acetate or formate, sulfonate, sulfate, formate, carbonate, or bicarbonate. Where $X^-$ is a polyvalent anion such as carbonate or sulfate, it is understood that the positive and negative charges in the quaternary ammonium and phosphonium structures are properly balanced. For example, where $R^{20}$ to $R^{23}$ are each methyls and $X^-$ is carbonate, it is understood that $X^-$ represents $2(CO_3^{-2})$.

Examples of organic quaternary phosphonium compounds include tetramethyl phosphonium hydroxide, tetramethyl phosphonium acetate, tetramethyl phosphonium formate, tetrabutyl phosphonium hydroxide, tetraethyl phosphonium acetate, tetrapropyl phosphonium acetate, TBPA, tetrapentyl phosphonium acetate, tetrahexyl phosphonium acetate, tetraheptyl phosphonium acetate, tetraoctyl phosphonium acetate, tetradecyl phosphonium acetate, tetradodecyl phosphonium acetate, tetratolyl phosphonium acetate, tetramethyl phosphonium benzoate, tetraethyl phosphonium benzoate, tetrapropyl phosphonium benzoate, tetraphenyl phosphonium benzoate, tetraethyl phosphonium formate, tetrapropyl phosphonium formate, tetraphenyl phosphonium formate, tetramethyl phosphonium propionate, tetraethyl phosphonium propionate, tetrapropyl phosphonium propionate, tetramethyl phosphonium butyrate, tetraethyl phosphonium butyrate, and tetrapropyl phosphonium butyrate, tetraphenyl phosphonium acetate (TPPA), tetraphenyl phosphonium phenoxide (TPPP), and combinations comprising at least one of the foregoing. The quaternary catalyst can comprise tetrabutyl phosphonium acetate, TPPP, TPPA, or a combination comprising at least one of the foregoing. In embodiments of the invention, the beta catalyst is TBPA.

The amount of the optional quaternary catalyst can be added based upon the total number of moles of dihydroxy compound employed in the polymerization reaction. When referring to the ratio of catalyst, for example, phosphonium salt, to all dihydroxy compounds employed in the polymerization reaction, it is convenient to refer to moles of phosphonium salt per mole of the dihydroxy compound(s), meaning the number of moles of phosphonium salt divided by the sum of the moles of each individual dihydroxy compound present in the reaction mixture. The amount of the optional quaternary catalyst (e.g., organic ammonium or phosphonium salts) can each independently be employed in an amount of $1\times 10^{-2}$ to $1\times 10^{-5}$, or $1\times 10^{-3}$ to $1\times 10^{-4}$ moles per total mole of the dihydroxy compounds in the monomer mixture.

The catalyst can comprise an alkali catalyst that is typically more thermally stable than the quaternary catalyst, and therefore can be used throughout transesterification, including during oligomerization, and after oligomerization, e.g., in the polymerization units, during polymerization. The alkali catalyst can be added to a polymerization at any stage in the polymerization, for example, upstream of, and/or directly to, and/or after a monomer mixing unit; and/or upstream of, and/or directly to, and/or after a polymerization unit (for example, to a first stage polymerization unit and/or the second reaction stage polymerization unit) Likewise, the catalyst addition process can be free of an alkali catalyst addition step.

The melt polymerization can be performed in the absence of the alkali catalyst. The melt polymerization can be free of an alkali catalyst addition step. When an alkali catalyst is added, the alkali catalyst can be added to an oligomerization unit. When an alkali catalyst is added, the alkali catalyst can be added to a polymerization unit.

An end-capping agent (also referred to as a chain stopper agent or chain terminating agent) can be included during polymerization to provide end groups. The end-capping agent (and thus end groups) are selected based on the desired properties of the polycarbonates. Exemplary end-capping agents are exemplified by monocyclic phenols such as phenol and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chlorofor-mates, p-cumyl phenyl chloroformate, and toluene chloroformate. Combinations of different end groups can be used.

The polymerization process can comprise a section of parallel polymerization, where parallel polymerization refers to the splitting of a polycarbonate stream into two or more streams that may or may not experience the same polymerization conditions thereafter (i.e., they can attain different molecular weights, have different additives added thereto, etc.). For example, polycarbonate can be prepared in a first portion of the polymerization process; a stream comprising polycarbonate can be split into two or more streams and directed to 2 or more parallel operating lines.

A quencher composition can be added at one or more locations in the present melt preparation of the polycarbonate, for example, as described in Example 1 and illustrated in FIG. 1, to reduce the activity of ionic catalyst or the optional alkali catalyst. The quencher composition comprises a quenching agent (also referred to herein as a quencher). Conversely, the melt polymerization can occur in the absence of an alkali catalyst and can therefore be free of a quencher. One of the possible quencher species is butyl tosylate (CAS 778-28-9).

The quenching agent can comprise a sulfonic acid ester such as an alkyl sulfonic ester of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkylaryl. Examples of alkyl sulfonic esters include benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate. The sulfonic acid ester can comprise alkyl tosylates such as n-butyl tosylate. The sulfonic acid ester can be present in the quencher composition in an amount of 0.1 to 10 volume percent (vol %), or 0.1 to 5 vol %, or 0.5 to 2 vol %, based on the total volume of the quencher composition.

The quenching agent can comprise boric acid esters (e.g., $B(OCH_3)_3$, $B(OCH_2CH_3)_3$, and $B(OC_6H_6)_3$), zinc borate, boron phosphate, aluminum stearate, aluminum silicate, zirconium carbonate, zirconium $C_1$-$C_{12}$ alkoxides, zirconium hydroxycarboxylates, gallium phosphide, gallium antimonide, germanium oxide, $C_1$-$C_{32}$ organogermanium compounds, $C_4$-$C_{32}$ tetraorganotin tin compound, $C_6$-$C_{32}$ hexaorganotin compound (e.g., $[(C_6H_6O)Sn(CH_2CH_2CH_2CH_3)_2]_2O$), $Sb_2O_3$, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, and titanium oxide, phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, $C_1$-$C_{12}$ dialkyl sulfates (e.g., dimethyl sulfate and dibutyl sulfate), sulfonic acid phosphonium salts of the formula $(R^aSO_3^-)(PR^b{}_4)^-$, wherein $R^a$ is hydrogen, $C_1$-$C_{12}$ alkyl, $C_6$-$C_{18}$ aryl, or $C_7$-$C_{19}$ alkylaryl and each $R^b$ is independently hydrogen, $C_1$-$C_{12}$ alkyl or $C_6$-$C_{18}$ aryl, sulfonic acid derivatives of the formula $A^1$ ($Y^1$ wherein $A^1$ is a $C_1$-$C_{40}$ hydrocarbon group having a valence of m; $Y^1$ is a single bond or an oxygen atom; $X^1$ is a secondary or tertiary alkyl group of the formula —$CR^{15}R^{16}R^{17}$, a metal cation of one equivalent, an ammonium cation (e.g., $NR^b{}_3^+$, wherein each $R^b$ is independently hydrogen, $C_1$-$C_{12}$ alkyl or $C_6$-$C_{18}$ aryl), or a phosphonium (e.g., $PR^b_4{}^+$, wherein each $R^b$ is independently hydrogen, $C_1$-$C_{12}$ alkyl or $C_6$-$C_{18}$ aryl); $R^{15}$ is a hydrogen atom or an alkyl group having 1 to 5 carbon atoms; $R^{16}$ is a hydrogen atom, a phenyl group or an alky group having 1 to 5 carbon atoms; and $R^{17}$ is the same as or different from $R^{15}$ and has the same definition as $R^{15}$, provided that two of $R^{15}$, $R^{16}$, and $R^{17}$ cannot be hydrogen atoms; and m is an integer of 1 to 4, provided that when Y1 is a single bond or an oxygen atom, and further provided that all of $X^1$ in an amount of m cannot be metal cations of one equivalent, a compound of the formula $+X^2$-$A^2$-$Y^1$—$SO_3{}^-$, wherein $A^2$ is a divalent hydrocarbon group; $+X^2$ is a secondary, tertiary or quaternary ammonium cation or a secondary (e.g., tertiary or quaternary phosphonium cation, and $Y^1$ is a single bond or an oxygen atom, a compound of the formula $A^3$-$(^+X^3)_n\cdot(R-Y^1-SO_3{}^-)_n$, wherein $A^3$ is a $C_1$-$C_{40}$ hydrocarbon group having a valence of n; $^+X^3$ is a secondary, tertiary or quaternary ammonium cation (e.g., $NR^b_3{}^+$ wherein each $R^b$ is independently hydrogen, $C_1$-$C_{12}$ alkyl or $C_6$-$C_{18}$ aryl), or a secondary, tertiary or quaternary phosphonium cation (e.g., $PR^b_4{}^+$ wherein each $R^b$ is independently hydrogen, $C_1$-$C_{12}$ alkyl or $C_6$-$C_{18}$ aryl); R is a monovalent $C_1$-$C_{40}$ hydrocarbon group; n is an integer of 2 to 4; and $Y^1$ is a single bond or an oxygen atom, a compound of the formula $A^5$-$Ad^1$-$A^4$-$(Ad^2$-$A^5)_l$, wherein $A^5$ is a monovalent or divalent $C_1$-$C_{40}$ hydrocarbon group; $A^4$ is a divalent $C_1$-$C_{40}$ hydrocarbon group, each of $Ad^1$ and $Ad^2$ is independently an acid anhydride group selected from —$SO_2$—O—$SO_2$—, —$SO_2$—O—CO— and —CO—O—$SO_2$—, and l is 0 or 1, provided that when l is O, -$(Ad^2$-$A^5)_l$ is a hydrogen atom or a bond between $A^4$ and $A^5$, in which $A^5$ is a divalent hydrocarbon group or a single bond, aminosulfonic esters having the formula $R_aR_bN$-A-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl or $R^a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like); $R_c$ is hydrogen; and A is $C_1$-$C_{12}$ alkyl, $C_6$-$C_{18}$ aryl, or $C_{17}$-$C_{19}$ alkylaryl (e.g., compounds such as N-(2-hydroxyethyl) piperazine-N'-3-propanesulfonic acid, 1,4,-piperazinebis (ethanesulfonic acid), and 5-dimethylamino-1-napthalenesulfonic acid), ammonium sulfonic esters of the formula $R_aR_bR_cN^+$-A-$SO_3{}^-$, wherein $R_a$, $R_b$, are each independently hydrogen; $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like); $R_c$ is a hydrogen; and A is $C_1$-$C_{12}$ alkyl, $C_6$-$C_{18}$ aryl, or $C_7$-$C_{19}$ alkylaryl, sulfonated polystyrene, methyl acrylate-sulfonated styrene copolymer, or a combination comprising at least one of the foregoing.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl) phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

A thermoplastic composition can further include an impact modifier. Examples of impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like.

An additive composition can be used, comprising one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble or non-soluble in polycarbonate. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

Figure 3:
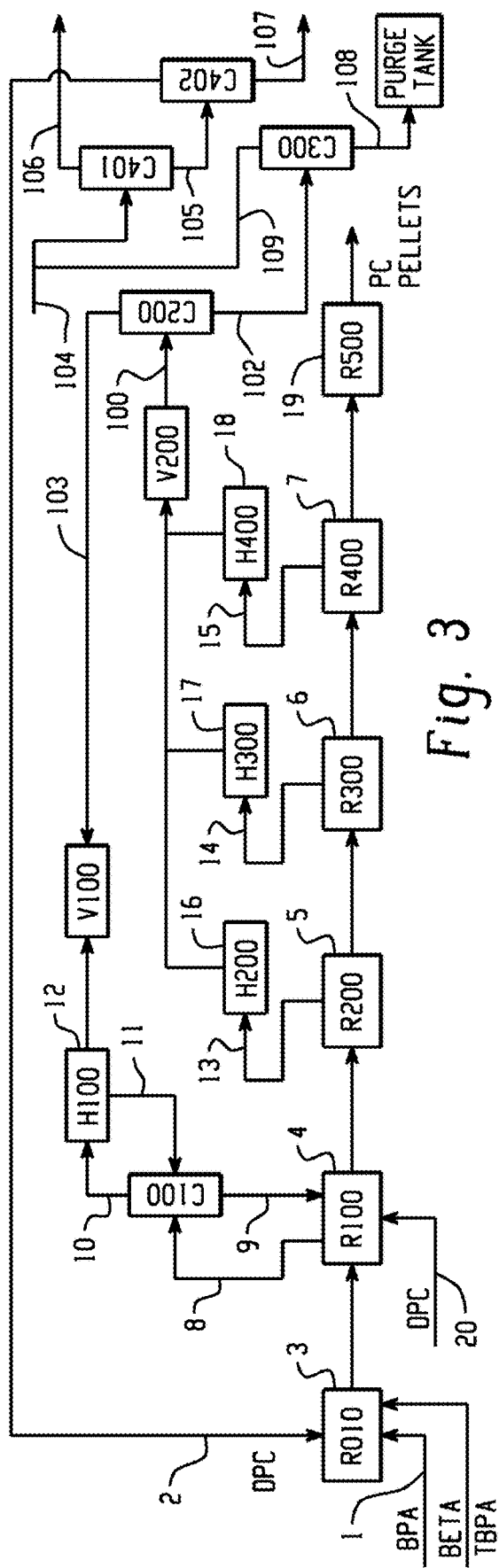
FIG. 3 is an illustration of a polymerization system according to Example 3.
Figure 4:
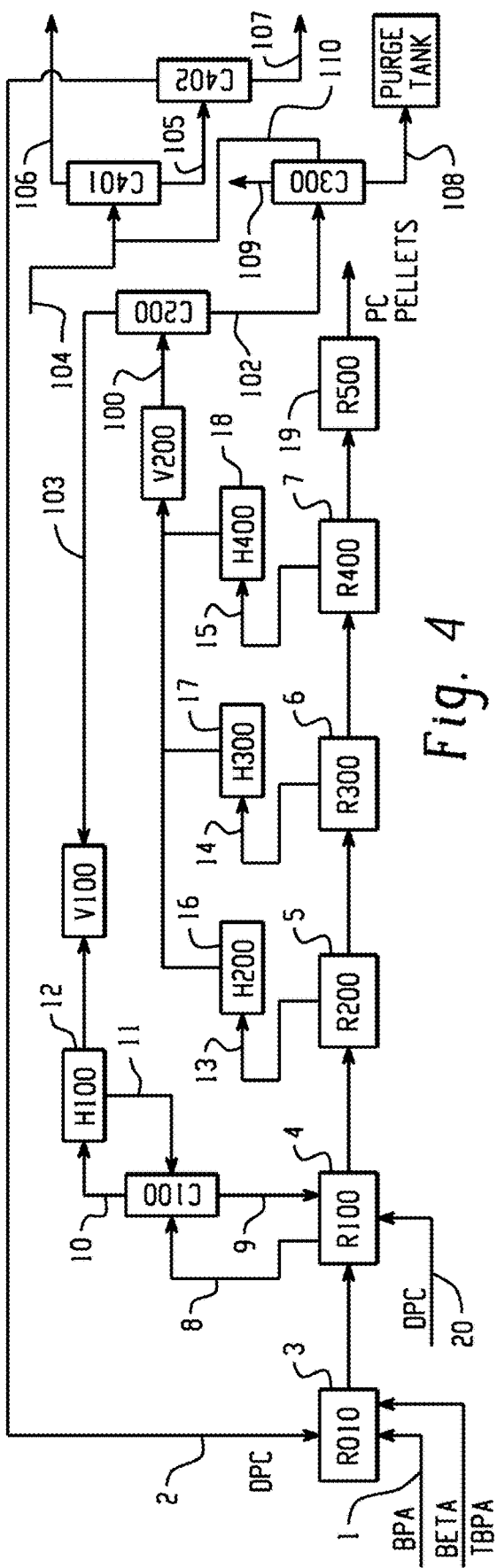
FIG. 4 is an illustration of a polymerization system according to Example 4.

FIGS. 3 and 4 illustrate examples of methods to implement the present process. In FIG. 3, for example, stream 108 can be used as a P control point. Since TBPO has a boiling point that is close the boiling point of DPC, most of the TBPO will exit distillation column C300 with DPC via top stream 109. C300 has to have a very high DPC recovery and as consequence most TBPO will accompany DPC instead of leaving the process via stream 108. Not to be limited by theory, it is believed that a sharp cut of color bodies can be attained such that most of the color bodies will be heavy boiling species that will be discarded via column C300 bottoms, while TBPO is recovered together with DPC.

Regarding FIG. 4, instead of recovering TBPO and DPC together, TBPO can be recovered from an intermediate column location as a side draw (stream 110). Thus, stream 110 will be rich in P, and can be used for recycling.

The compositions, methods, and articles are further illustrated by the following non-limiting examples.

EXAMPLES

A phosphorus (P) content is measured using an Agilent ICP-MS (Inductively Coupled Plasma Mass Spectrometry) 7700E model with Helium Mode Collision Reaction Cell. SeaSpray nebulizer was used in all the measurements. The software that was used to interpret ICP-MS response was ICP MassHunter™ Workstation Software.

The polycarbonate (PC) and diphenyl carbonate (DPC) samples were prepared as follows: (i) 0.25 gram (g) of sample were added in a digester flask together with 3 ml of HCl (30 wt %) and 5 ml of $HNO_3$ (69 wt %) by duplicate; (ii) flasks are set in a microwave oven at 220° C. for 60 min, (iii) digested samples are recovered in 40 ml of Milli-Q™ purified water (Milli-Q™ water produced and distributed by Millipore), (iv) the resulting solution was introduced in an appropriate Corning tube and then was analyzed in ICP-MS equipment.

PC and DPC samples have been analyzed by high-performance liquid chromatography with diode array detection (HPLC-DAD) under the conditions set forth in Table 1. About 2.5 g of sample (PC and DPC material) is dissolved in 7.5 ml of tetrahydrofuran (THF) solution containing 10 wt % of potassium hydroxide diluted in methanol. The solution is shaken for 20 minutes at 40° C. Then, 1.5 ml of pure acetic acid is added to stop the reaction. The solution is then shaken, filtered and injected into the HPLC system. Appropriate standards for preparation of calibration curves to determine concentration of each of the following compounds were prepared, where the compounds include 4-methylcoumarin, p-isopropenyl phenol, o,p-BPA (ortho- and para-bisphenol A), DMX (9,9 dimethyl xanthene CAS: 19814-75-6), and BPX-1

BPX-1

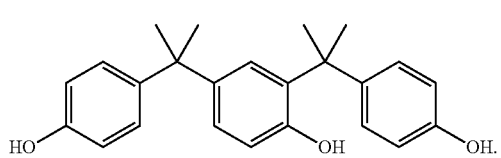

Hydro stability testing was performed using a molded 2.5 mm color non-textured plaque that was placed in an autoclave at 120° C. and 100% humidity for 9 days, wherein the results were measured daily. The plaques are measured in a BYK haze-gard to obtain haze and percent transmission results according the ASTM D1003, via procedure A and illuminant C.

For the average (Avg.) measurements provided in the tables, the number of samples (#S) used for the average is provided.

It is noted that baseline operations, as is illustrated in FIG. 1, were established before all testing.

TABLE 1

HPLC-DAD operating conditions.

| Flow rate: | 3 milliliters per minute (ml/min) | | |
|---|---|---|---|
| Column: | Kinetex ™ 5 µlBiphenyl 100 A 50 × 4.6 millimeters (mm) | | |
| Injection volume: | 5 microliters (µl) | | |
| UV detector | DAD 255 nm, 270 nm, 280 nm, 320 nm | | |
| Gradient | time | ACN | Water |
| | 0 | 20% | 80% |
| | 1.27 | 20% | 80% |

TABLE 1-continued

HPLC-DAD operating conditions.

| Flow rate: | 3 milliliters per minute (ml/min) | | |
|---|---|---|---|
| Column: | Kinetex ™ 5 µlBiphenyl 100 A 50 × 4.6 millimeters (mm) | | |
| Injection volume: | 5 microliters (µl) | | |
| UV detector | DAD 255 nm, 270 nm, 280 nm, 320 nm | | |
| Gradient | time | ACN | Water |
| | 2.55 | 25% | 75% |
| | 5.09 | 30% | 70% |
| | 7.64 | 40% | 60% |
| | 10.18 | 40% | 60% |
| | 12.73 | 60% | 40% |
| | 14.00 | 100% | 0% |
| | 15.27 | 60% | 40% |
| | 16.50 | 40% | 60% |
| | 18.00 | 20% | 80% |

Tributyl phosphine oxide (TBPO) (weight average molecular weight (Mw): 218.32 g/mol) and tetrabutyl phosphonium acetate (TBPA) (Mw: 318.47 g/mol) contents are determined based on the phosphorus content associated with those species. In other words, 1 ppm of elemental P measured represents 7.0 ppm of TBPO or 10.3 ppm of TBPA.

The "cookie test" was employed to determine the oxidation stability of a polycarbonate prepared by the methods described herein. The test includes heating 50 g of polycarbonate pellets at a temperature of 250° C. for 2 hours in air. The resulting plaque (also referred to as a "cookie") is also used for color measurement.

In the case of color measurements for optical characterization, flat non-textured color chips of 2.5 mm width were molded by means of a ENGEL Victory 120 molding machine using the following conditions: (i) Temperature ("Temp") (° C.), barrels: 285/290/290/285, and mold: 75; (ii) injection rate: 90 $cm^3$/s; (iii) backpressure: 45 bar/10 second (s) (4.5 megaPascals (mPa)/10 s); (iv) dosage: 105.5 $cm^3$ (84 mm out of 200 mm, 42% out of 251.3 $cm^3$), rate: 0.293 m/s (35% out of 0.837 m/s), pressure: 3 bar (0.3 mPa); (v) cooling time: 15 s; and (vi) cycle time: 40 s.

Color values (L*, a*, b* and YI) are calculated from the absorption spectrum of a plaque (cookie) or using a 2.5 mm thick color plaque (60×60 mm) between 360 nm and 750 nm. The spectrum is measured on a Macbeth 7000A device in transmission mode and UV included. The L*, a*, b* and YI values have been calculated according the ASTM D1925 method.

It has been observed that when TBPA is used as a beta catalyst in the polycarbonate production process, along the process, TBPO and other phosphate esters, for example,

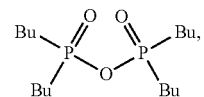

are produced.

TBPO is volatile and can be vaporized under the conditions of the polymerization reaction. During processing, because TBPO has a similar vapor pressure as DPC, for example, a significant amount of the TBPO can be distilled with DPC. Accordingly, TBPO and related phosphate esters generated by the polymerization reaction can be recycled with recovered DPC through a recycle loop. It has been surprisingly further observed that incremental amounts of TBPA render higher contents of TBPO and related phosphate esters being produced and make the obtained polycarbonate less labile to oxidation reactions due to higher P content, which has been measured via accelerated oxidation test ("cookie test"). Table 2 shows P content (ppm) and a* cookie value (with 2 ppm of quencher) for pilot plant runs operating under the polycarbonate production process described in Example 5 below. Desirably, the a* value is −0.3 to −0.4. Consequently, the desired P content is 2 to 10 ppm. Not to be bound by theory, higher P content is believed to adversely affect the mechanical properties of the polycarbonate, such as the hydrostability.

TABLE 2

| TBPA load | P content (ppm) in PC | | a* value cookie | |
|---|---|---|---|---|
| | Average (Avg.) | Standard Deviation (STD) | Average (Avg.) | Standard Deviation (STD) |
| 50 umol/molBPA | 1.7 | 0.520 | −0.301 | 0.182 |
| 200 umol/molBPA | 8.83 | 0.350 | −0.389 | 0.051 |
| 300 umol/molBPA | 21.32 | 0.822 | −0.587 | 0.131 |

In Table 3 the DPC impurities content (wt %) is shown for the polycarbonate production process described in Examples 1, 2 and 3 below. Example 1 (the baseline conditions (BL)) describes an exemplary polycarbonate production process according to embodiments of the invention. Example 2 describes an alternative polycarbonate production process where the stream 102 containing TBPO and DPC was directed to a purge tank. Example 3 describes yet another polycarbonate production process where it has been observed that unwanted color inducing species are recycled into the process via the recycle loop and result in the polycarbonate having undesirable content of the color inducing species. See Table 3 below.

TABLE 3

DPC impurities content (wt %) for different operation configurations.

Figure 2:
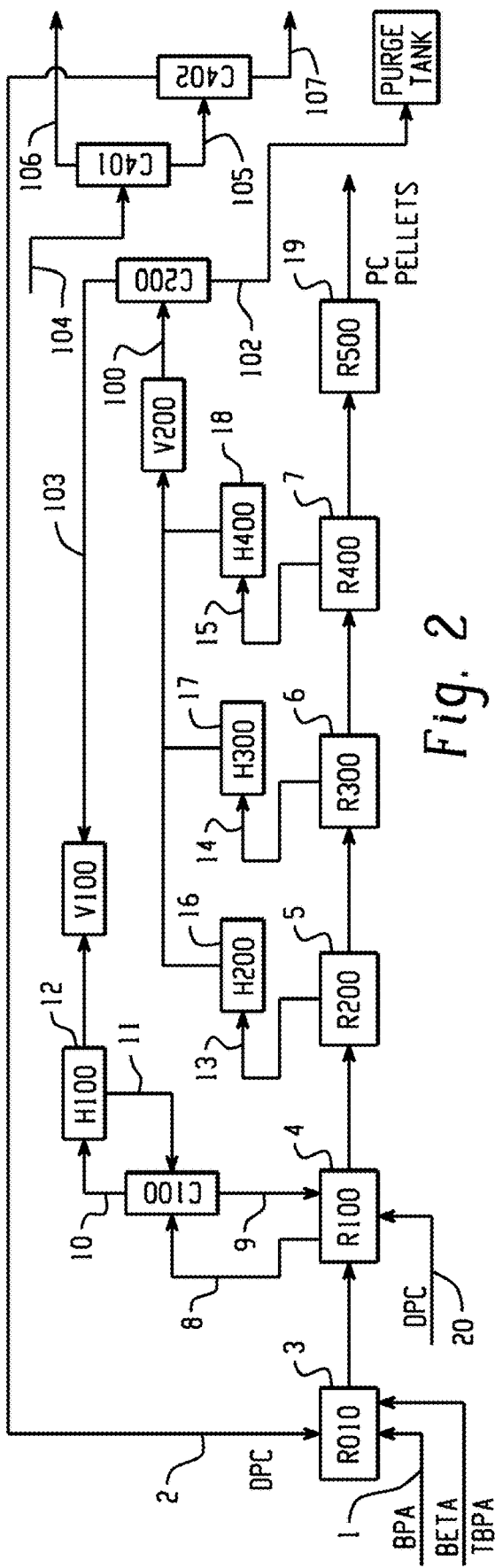
FIG. 2 is an illustration of a polymerization system without a second scrubber bottoms recycled into the system according to Example 2.

| Row Labels | # S | Avg. of Impurities (wt %) | STD Deviation of Impurities (wt %) | Avg. content of DMX (ppm) |
|---|---|---|---|---|
| BL (Example 1) - FIG. 1 | 12 | 0.598 | 0.055 | 4011 |
| Example 3 FIG. 3 | 19 | 0.438 | 0.084 | 3036 |
| BL (Example 1) FIG. 1 | 20 | 0.464 | 0.084 | 2858 |
| Example 2 FIG. 2 | 29 | 0.247 | 0.099 | 1542 |

The initial color and the color after aging of polycarbonates is affected by the amount of color inducing species present. For example, the color inducing species can be isopropenyl group-containing compounds or 9,9 dimethyl xanthene (DMX). Accordingly, lower content of the color inducing species is associated with lower coloration in the polycarbonate, and therefore is desirable.

As further detailed in the Examples 1-5, the inventors have discovered operational changes in the polycarbonate production process that allow production of polycarbonates with lower color and increased P concentration.

Example 1

FIG. 1 shows an exemplary polycarbonate production process. The reactants DPC and BPA are mixed in a monomer mixing unit (R010) in the presence of TBPA. The process stream continues to first oligomerization reactor (R100). A scrubber (C100) operating on top of R100 recycles DPC and BPA back to R100 and removes phenol. A set of equipment (H100, V100) allows for condensing vapor product from C100 and conditioning appropriate distillate and reflux rate for C100. The process stream continues to second oligomerization reactor (R200). The process stream continues to first polymerization reactor (R300), second polymerization reactor (R400), and third polymerization reactor (R500). A set of equipment (H200, H300, H400) allow for condensing or sublimating the vapor streams leaving R200, R300 and R400, respectively, to remove mainly phenol and sending those materials to V200. These materials may contain phenol, DPC, BPA, and TBPO and related phosphate esters produced. The materials then continue to the second scrubber (C200). From C200 phenol is separated into the top stream 103. Due to its volatility TBPO remains in the bottom stream 102 together with DPC.

The stream 102 is subsequently fed into two extraction columns (C401 and C402). The two extraction columns are in communication via a bottom stream 105. The bottom stream 105 may contain residual phenol, DPC, BPA, TBPO, and other phosphate esters, which is fed into C402. The top stream (2) of C402 comprises DPC/TBPO that are recycled to monomer mixing unit (R010). A bottom stream (107) of C402 removes high boilers (HB).

It has been observed during the production process described in Example 1 and illustrated in FIG. 1 that the contents of P in DPC when operating with 50 micromoles (μmol) of TBPA/molBPA ranges from 50-70 ppm of P in the DPC. Since the ratio of P to TBPO is 31/218 (ppm P)/(ppm TBPO), then TBPO content is in the range of 350 to 495 ppm. P content in PC (from the TBPO present) under those conditions is in the range of 5-10 ppm.

Example 2

FIG. 2 shows an alternative polycarbonate production process where the stream 102 containing TBPO and DPC was directed to a purge tank. In this case, all material ranging from medium boiling species (MB) to high boiling species (HB) are purged. This reduces the recycle of MBs, DPC, TBPO and other HBs back to the process. Under this configuration, contents of TBPO in DPC operating with 50 μmol of TBPA/molBPA drop drastically to 1-5 ppm of P.

Table 4 illustrates the P content in the DPC and PC. In case of PC, the P content must be analyzed considering that the PC also contains certain amount of other extrusion stabilizer/processing aid Irgafos™ 168 (tris(2,4-di-tert-butylphenyl)phosphite, CAS: 31571-04-4, Mw: 646.9 g/mol). Thus, the P total content is not directly affected by the DPC re-route as shown in Table 4. The P (ppm) content during the polycarbonate production process illustrated in FIG. 1. The 2.95% mean confidence interval (CI) was calculated using MS Excel Confidence.t function and 0.05 as alpha. Examples B and D have improved initial color (lower b* at pellets) but have higher a* cookie value (compared to Example A).

Regarding Table 5, Example E, besides having Irgafos™, also contains 5 ppm of $H_3PO_3$. Even at those additions the total P content in PC is in the same order of magnitude as Example C, and shows a lower initial a*. However, referring to Table 6, it is clear that the hydrostability is less for Example E compared to Example C. As can be seen in Table 6, the initial transmission percent (T %) is similar for Example C and E (92.04 and 92.07, respectively). However, after 5 days transmission percent (T %) drops for Example E to 87.99 while for Example C, it is maintained at 90.95. This is also shown in the haze numbers where after 5 days Example E has a haze of 4.774, while Example C has a haze of 2.219. Clearly, merely adding additional additives to increase the P content of the polycarbonate does not attain the improved PC achieved in the present disclosure using a higher P content in the recycle stream. Surprisingly, a different PC is obtained in each case.

It has been discovered that the level of the color inducing species at the monomer mixing stage (R010) is not as high as the color inducing species level at the first oligomerization reactor (R100) and the color inducing species level at the second oligomerization reactor (R200) content is lower than the level at R100. The highest the color inducing species content is found in R100. The levels of the color inducing species in the scrubber operating on top of R100 show that the bottoms stream recycling DPC and BPA back

TABLE 4

| | | P (ppm) content | | | | | | | | | | |
|---|---|---|---|---|---|---|---|---|---|---|---|---|
| | | DPC to PC (stream #2) | | | PC pellets (stream #19) | | | b* | | | a* | |
| Example | | Avg.[1] | STD | 95% CI | Avg.[1] | STD | 95% CI | #S | Avg. | Std. | #S | Avg. | Std. |
| A | Set 1 | 60.05 | 0.26 | 0.66 | 10.03 | 0.40 | 1.00 | 15 | 3.90 | 0.23 | 9 | 0.20 | 0.06 |
| B | Set 3 | 1.98 | 0.68 | 1.68 | 9.23 | 0.15 | 0.38 | 4 | 2.71 | 0.26 | 5 | 0.82 | 0.12 |

Set 1 means polycarbonate production process as shown in FIG. 1
Set 3 means polycarbonate production process as shown in FIG. 2

S = number of samples used to determine the average (Avg.).
[1]Number of Samples (#S) was 3

TABLE 5

| | | P (ppm) content | | | | | | | | | | |
|---|---|---|---|---|---|---|---|---|---|---|---|---|
| | | DPC to PC (stream #2) | | | PC pellets (stream #19) | | | b* | | | a* | |
| Example | | #S | Avg. | Std. | #S | Avg. | Std. | #S | Avg. | Std. | #S | Avg. | Std. |
| C | Set 1 | 8 | 168.0 | 8.6 | 4 | 4.0 | 1.3 | 20 | 2.33 | 0.09 | 7 | 0.173 | 0.050 |
| D | Set 3 | 9 | 13.3 | 5.0 | 1 | BLD | 0.2 | 47 | 1.52 | 0.26 | 4 | 0.242 | 0.017 |
| E[2] | Set 3 | | 13.3 | 5.0 | 5 | 5.0* | | | | | 12 | 0.002 | 0.163 |

BLD = below detection limits; detection limit was 2 ppm.
*[2]samples were BLD.

TABLE 6

| | | Hydrostability Test | | | | | | | |
|---|---|---|---|---|---|---|---|---|---|
| | | Initial Time | | | | After 5 days | | | |
| Example | #S | Avg. % T | STD % T | Avg. Haze | STD Haze | Avg. % T | STD % T | Avg. Haze | STD Haze |
| C | Set 1 | 4 | 92.04 | 0.05 | 0.461 | 0.095 | 90.95 | 0.46 | 2.219 | 0.098 |
| [2]E | Set 3 | 10 | 92.07 | 0.03 | 0.468 | 0.079 | 87.99 | 2.23 | 4.774 | 2.116 |

[2]Sample further includes 5 ppm H$_3$PO$_4$

The Hydro stability test: Molded 2.5 mm color non-textured plaques are placed in autoclave at 120° C. and 100% humidity for 9 days. The plaques are measured in a Xrite color i7 spectrophotometer to obtain Haze and % Transmission according the ASTM D1003 method.

Low boiling (LB) species are those lighter than phenol, MBs are those that have boiling points between those of phenol and DPC, while HBs are those heavier than DPC.

The return of DPC, TBPO, and other phosphate esters to the process is beneficial to the monomer uses and is desired. Due to this TBPO and other phosphate esters concentration drop poor oxidation stability of the polycarbonate was also observed. However, this process allowed for an improved color polycarbonate because the color inducing species were purged.

to R100 has a higher content of the color inducing species than R100 or the scrubber (C100) top stream. The former affirmation is based on a C100 operation that allows for a very pure recovery of the top product, lower reflux ratio and consequently other operating conditions might render a different impurities distribution. In the case of C200, it has been discovered that most color species will remain in the bottoms and that, a few of the color species could be present in the top, being the distribution dependent on the reflux ratio under which C200 is operated. For the column C300 Table 7 summarizes the observed DPC mass balance, the following mass balance was obtained with the column C300 operating under no reflux condition.

TABLE 7

DPC (wt %) and associated flows for the C300 column operation with no reflux at a commercial scale.

| Stream # | Avg. Total Flow (kg/h) | STD Total Flow (kg/h) | Avg. DPC (wt %) | STD DPC (wt %) | Avg. DPC flow (kg/h) | STD DPC flow (kg/h) |
|---|---|---|---|---|---|---|
| 102 | 519 | 108 | 62.2 | 1.3 | 323 | 67 |
| 109 | 350 | 80 | 85.3 | 1.7 | 299 | 69 |
| 108 | 169 | 135 | 15.0 | 1.7 | 25 | 20 |

In addition, some color inducing species are MB and can be lowered by, for example, increasing the side draw (SD) flow. In the case of an isopropenyl phenol-phenyl carbonate or in the case of isopropenyl phenol dimers, isopropenyl phenol trimers, or isopropenyl phenol oligomers, separation of those species is more complex, since they all are HBs and in some cases close boilers to DPC.

Therefore, it was found that the SD flow is desirable during DPC purification, and allows for an improved TBPO and other related recovery (e.g., phosphate esters), while decreasing the concentration of color inducing species.

Example 3

FIG. 3 shows another alternative polycarbonate production process designed in order to solve the drop in concentration of TBPO described in the previous example and shown on FIG. 2. A new distillation column (C300) was added to recover TBPO and DPC, which are then re-routed back to the process via a top stream (109) of the column C300. It has been observed that DPC split ratios larger than 0.6 are needed in order to observe the oxidation benefits in the polycarbonate. The main reason for this is that the in the Example 2, where DPC recovery was close to 0.6, showed color benefits, but it did not show the P content that would provide the oxidation benefits. The reasons for this are (i) C130 top was not routed to the C401, causing the lost P content and (ii) higher than 0.6 recoveries of DPC are required in order to pull more TBPO and other phosphate esters from the bottoms product up to the top product. However, it has been discovered that the process described in FIG. 3 did not increase TBPO and other phosphate esters content in the stream 105. In the case of the C300 operation, P contents observed for a 0.6 split of DPC and operation without reflux are those in next Example 4. Feed has a 243 ppm, top product 289 ppm and bottoms 103 ppm.

These tests show that TBPO and other phosphate esters can be recovered if appropriate DPC recovery is allowed in a DPC recovering column, for example C300.

The data in Example 3 discloses that the P content can be modified by changing DPC recoveries in C300.

Table 8 identifies P (ppm) content in the different streams on a commercial scale, showing DPC/P contents changes. The streams numbers refer to the streams shown in FIGS. 1 to 2. Set 1 data refers to baseline composition (while operating in configuration as shown in FIG. 1). Set 3 refers to data when stream 102 re-route is done, as shown in FIG. 2.

TABLE 8

| Stream # // Set # | # of samples | Avg. of P (ppm) | STD of P (ppm) |
|---|---|---|---|
| #102 // Set 3 | 7 | 243 | 25.2 |
| #108 // Set 3 | 6 | 103 | 19.3 |
| #109 // Set 3 | 5 | 289 | 61.5 |
| #105 // Set 3 | 5 | 5 | 2.5 |
| #2 // Set 1 | 4 | 71 | 3.1 |
| #2 // Set 3 | 7 | 7 | 1.7 |

Under the configuration of the process in FIG. 3, the stream 109 was not directly connected to C401. Therefore, the P content in the stream 105 was not obtainable. It has been confirmed via GCMS and P31 NMR analysis the P species in the DPC recovery columns C200 and C300 is TBPO, and that TBPO related phosphate esters are also present in small contents due to the volatilities of these species.

Example 4

FIG. 4 shows another alternative polycarbonate production process in which DPC and TBPO are allowed to leave C300 as a side draw (SD) stream. The side draw stream can be located at any position along the C300 profile, and can remove different amounts of material. Typically, SD streams are located at the location along the column concentration profile at a point, which the concentration of the species to be withdrawn is the highest. This configuration also allows for a purge of color inducing species, which might be accompanying DPC as shown on FIGS. 2 and 3. Thus, the SD (as shown on FIG. 4) allows for a selective purge of a group of species with similar boiling point while returning DPC and TBPO back to the process.

Example 5

Figure 5:
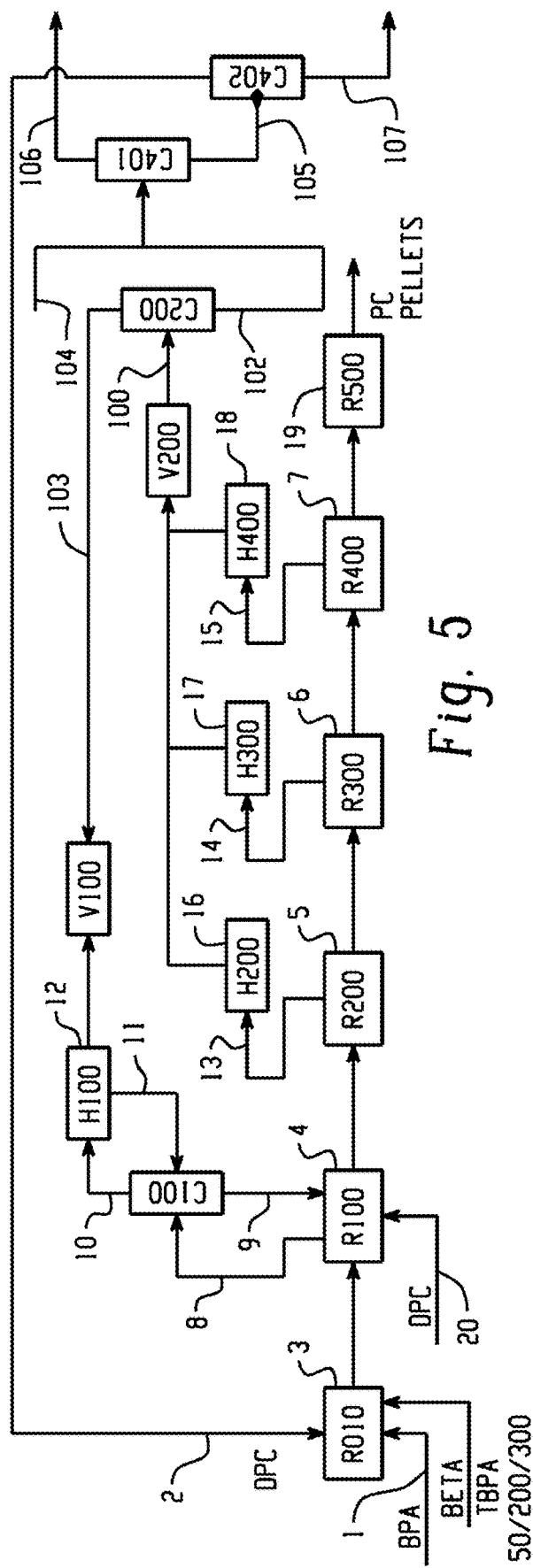
FIG. 5 is an illustration of a polymerization system according to Example 5.

FIG. 5 shows another alternative polycarbonate production process in which increased amounts of TBPA have been provided into the system in order to obtain higher content of P. TBPA can be introduces at R010, as well as later in the process. The decreasing of the "cookie" value with the increasing of the P content was observed in the polycarbonate.

Table 9 sets forth operating conditions during the TBPA loading as shown in FIG. 5 on a pilot scale (42 kilograms per hour (kg/h)).

TABLE 9

| Conditions | Formulated Molar Ratio (molDPC/molBPA) | TBPA Load (μmol/molBPA) | SP NaK catalyst loading ppb* |
|---|---|---|---|
| TBPA/42 kg/h (18-01); stable Fries (1000) | 1.034 | 50 | 28.0 |
| BL/high beta (300 μmol) with quencher | 1.034 | 300 | 141.6 |
| BL/high beta (300 μmol) without quencher | 1.037 | 300 | 128.2 |
| BL/normal beta (50 μmol) with quencher | 1.039 | 50 | 31.8 |
| BL/normal beta (50 μmol) without quencher | 1.039 | 50 | 37.5 |
| BL/high beta (200 μmol) without quencher | 1.048 | 200 | 78.5 |

TABLE 9-continued

| Conditions | Formulated Molar Ratio (molDPC/molBPA) | TBPA Load (μmol/ molBPA) | SP NaK catalyst loading ppb* |
|---|---|---|---|
| BL/high beta (200 μmol) with quencher | 1.049 | 200 | 75.4 |
| BL/normal beta (50 μmol) without quencher | 1.035 | 50 | 44.7 |
| BL/normal beta (50 μmol) with quencher | 1.035 | 50 | 43.9 |

*parts per billion by weight

Table 10 sets forth P content for the different operating conditions of Table 7.

TABLE 10

| TBPAload(μmolTBPA/ molBPA)_Quencherload (ppm) | Number of Samples for the Avg. | Avg. P (ppm) | STD P (ppm) |
|---|---|---|---|
| 50_0 | 2 | 1.73 | 0.11 |
| 200_0 | 3 | 9.18 | 0.60 |
| 300_0 | 2 | 20.38 | 0.11 |
| 50_2 | 5 | 1.72 | 0.32 |
| 200_2 | 3 | 8.48 | 0.20 |
| 300_2 | 4 | 21.79 | 1.43 |

The observed P contents set forth in Table 8 are related to P containing species that are heavier than TBPO, and are related species to TBPO related phosphate esters, for example,

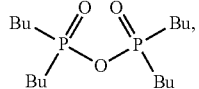

which in addition to TBPO were observed during degradation studies of TBPA.

In this configuration with the TBPA loading, the alpha catalyst loading increases are required. For example, increase 30-44 parts per billion by weight (ppb) for the 50 μmol TBPA, 80-75 ppb for 200 μmol TBPA, and 130-140 ppb for the 300 μmol TBPA.

Figure 6:
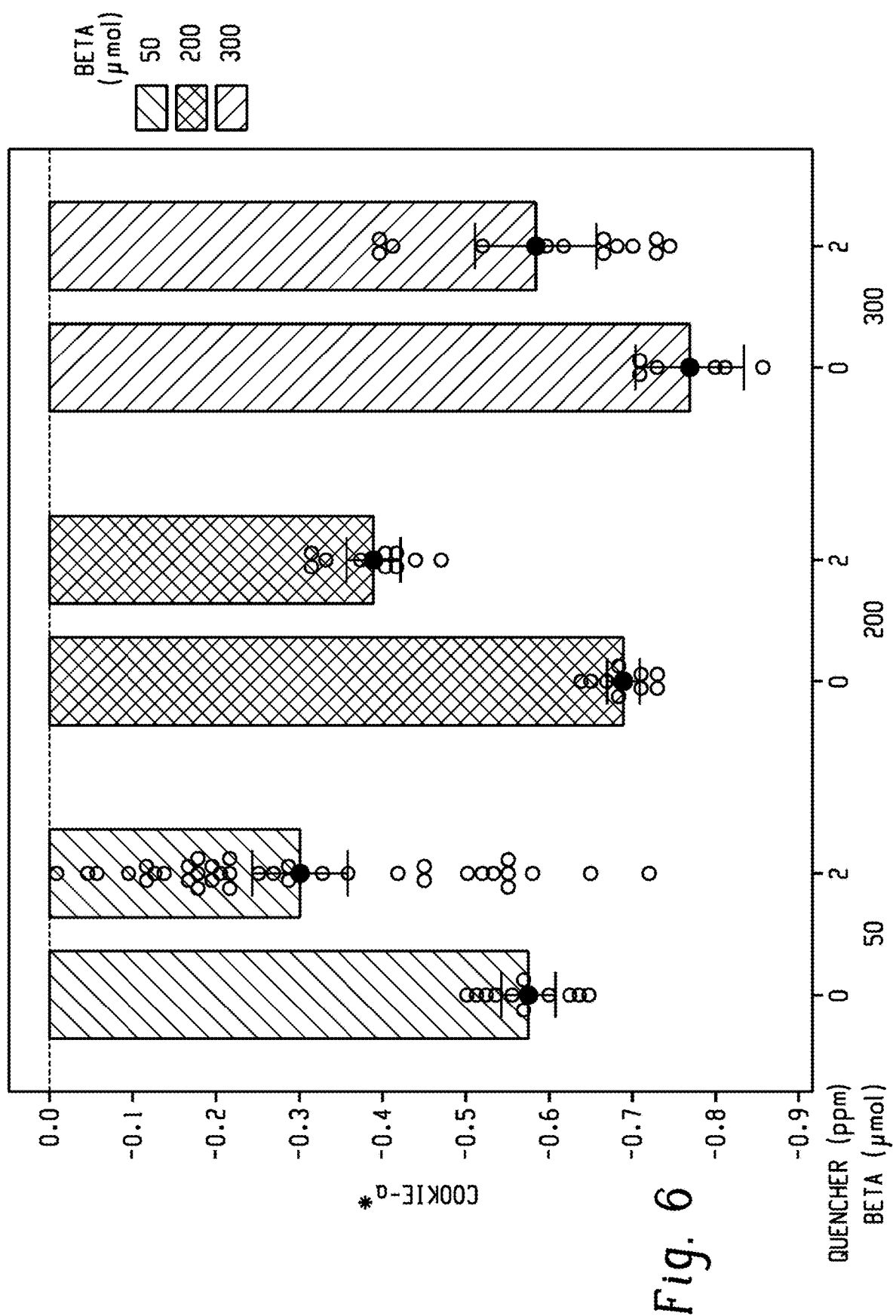
FIG. 6 shows cookie test values during the TBPA loading on a commercial scale.

The TBPA loading process as illustrated by FIG. 5 reduces cookie a* value from −0.3 to −0.6, as shown in FIG. 6. Removing the quencher increases cookie a* value by a similar amount. Table 11 illustrates a* cookie values for operation of process as depicted in FIG. 5 on a pilot scale.

TABLE 11

| TBPAload(μmolTBPA/ molBPA)_Quencherload (ppm) | Avg. of a* @ cookie | STD of a* @ cookie |
|---|---|---|
| 50_0 | −0.577 | 0.051 |
| 200_0 | −0.688 | 0.028 |
| 300_0 | −0.770 | 0.062 |
| 50_2 | −0.301 | 0.182 |
| 200_2 | −0.389 | 0.051 |
| 300_2 | −0.587 | 0.131 |

Table 12 illustrates b* color value at 2.5 mm color plaques during the TBPA loading process as shown in FIG. 5.

TABLE 12

| Exp. run # | Quencher | # of measured plaques | Avg. of b* @2.5 mm plaque | STD of b* @2.5 mm plaque | TBPA Load (μmol/molBPA) |
|---|---|---|---|---|---|
| 1 | Not present | 40 | 1.383 | 0.032 | 50 |
| 2 | Present | 60 | 1.410 | 0.030 | 50 |
| 3 | Present | 60 | 1.327 | 0.029 | 50 |
| 4 | Not present | 40 | 1.594 | 0.059 | 200 |
| 5 | Present | 40 | 1.670 | 0.034 | 200 |
| 6 | Not present | 30 | 1.995 | 0.046 | 300 |
| 7 | Present | 30 | 1.721 | 0.060 | 300 |

The data in Tables 11 and 12 illustrates that PC pellets with low TBPA load show lower a* and b* color values, but lower P content and thereby lower oxidation stability as shown in Table 10. Not to be bound by theory, it was discovered that purging some species in DPC decreases initial color as that measured in the pellets. However, those purges also remove P and consequently impact negatively on the cookies value. In the case of the TBPA runs we observed that higher TBPA worsened the plaques color, but surprisingly, the cookies value decreased. TBPA generates some colored species, but helps in the antioxidant species.

Hence, the processes described in Examples 3 and 4 produce overall better results in attaining the desired content of P and lower color values. More specifically, in Example 3 the distillation column C300 was added to the process in order to recover TBPO and DPC, which are then re-routed back to the process via the top stream 109 of the column C300. This allowed for a higher recovery of TBPO and other phosphate esters when appropriate DPC recovery is allowed in a DPC recovering column, for example C300. In Example 4, the side draw stream was added, which allowed for the selective purge of a group of species (i.e., color inducing species) while returning DPC and TBPO back to the process. Thus, the processes described in Examples 3 and 4 allow for the polycarbonate with the desired oxidation stability due to the higher P content and reduced color.

Example 6

The effect of TBPO on a* was determined by adding different amounts of TBPO to a polycarbonate sample. All of the remaining elements remained the same. Polycarbonate was added to an extruder. Once the extruder settings were 25 kg/h, at 100 rotations per minute (rpm), with barrel temperatures of 280° C./290° C./300° C./300° C./300° C./300° C./295° C., and a die temperature of 290° C. The TBPO was added into the extruder barrel after the polymer mass was molten. Its added using a masterbatch that contains TBPO as a masterbatch containing the TBPO. Based upon the amount of TBPO added, the amount of P was calculated. The calculated amount and measured amounts of P are set forth in Table 13.

TABLE 13

| Sample | TBPO concentration (ppm) | P (ppm) (calculated) | # Samples for Avg. | Avg. P (ppm) (ICP-MS measured) |
|---|---|---|---|---|
| A | 0 | — | 2 | <0.4 |
| B | 34 | 4.8 | — | — |
| C | 168 | 24 | 2 | 24.7 |

Figure 7:
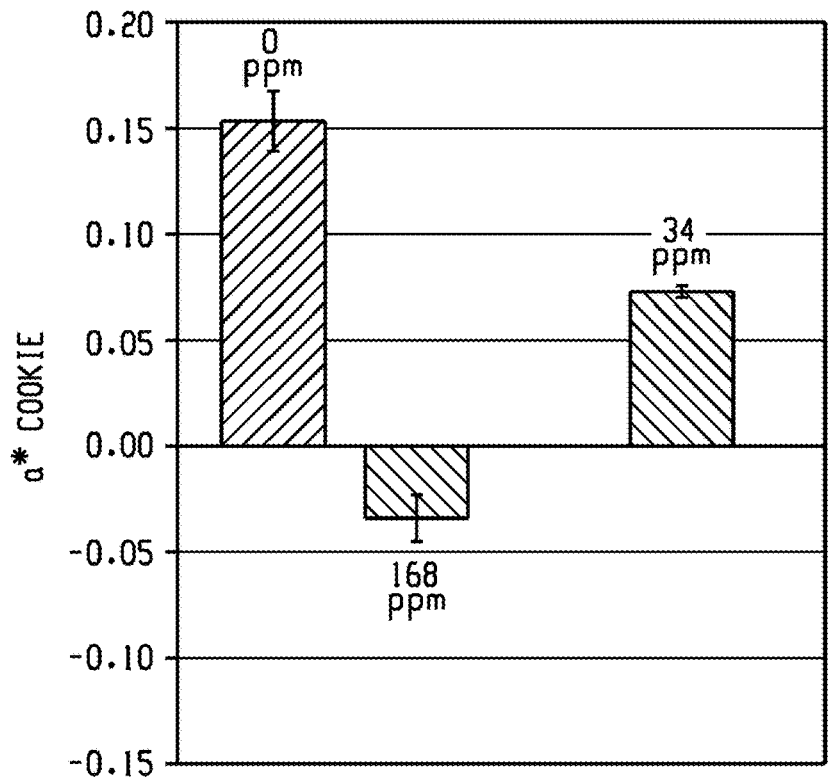
FIG. 7 is a graphical representation of the effect of TBPO loading on cookie test values for a*.

Since the TBPO was the only difference between Samples A, B, and C, any effect on the cookie a* value is due to the presence of the TBPO. Referring to FIG. 7, it can be seen that the polycarbonate with no added TBPO had an a* of 0.15, while the Samples with added TBPO had a* values of about 0.075 and about −0.03. Generally, it is desired to reduce the a* (redness, thus making it greener) value such that the polycarbonate has better color stability under oxidant conditions, such as the ones experienced during the "cookie-test". Higher beta catalyst loading (e.g., greater TBPA loading) results in a higher b*, i.e., a more yellow PC (as observed in the Table 12). As a result, it was expected that a higher concentration of its degradation product (TBPO) would result in faster degradation (e.g., oxidation that causes a change in color, resulting in a higher b*). It was unexpectedly discovered that the initial color was the same with a greater amount of TBPO, but the subsequent degradation was better, thereby resulting in a better color.

Figure 8:
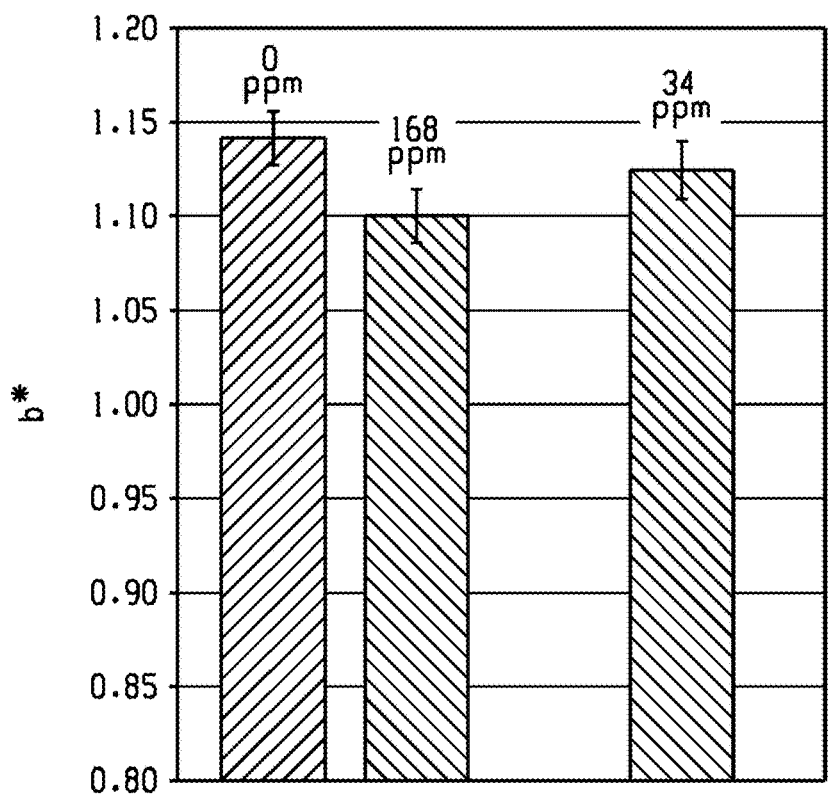
FIG. 8 is a graphical representation of the effect of TBPO loading on cookie test values for b*.

FIG. 8 provides b* value for 2.5 mm color plaques with TBPO as additive. The data shows that the initial b* color is not significantly modified by the addition of TBPO.

As shown above, the better color is attained with the presence of a small amount of additional P (e.g., 2 to 10 ppm, preferably 4 to 10 ppm, or 5 to 10 ppm) in the PC. This equates to a P (e.g., in TBPO) content in the recycle stream (or recycled DPC), of greater than or equal to 40 ppm. It is noted that merely increasing the concentration of P in the PC, such as by adding additional P containing additives (such as $H_3PO_3$), adversely affected the hydrostability of the PC, while increasing the P concentration as disclosed herein, using the recycle stream maintained the hydrostability properties.

Set forth below are some aspects of the method, polycarbonate, and articles.

Aspect 1: A method of preparing a polycarbonate composition in a polymerization system, the method comprising: melt polymerizing a dihydroxy compound with a diaryl carbonate compound in the presence of a quaternary phosphonium catalyst; recycling a phosphorus-containing byproduct of the quaternary phosphonium catalyst, or diaryl carbonate compound, or a mixture thereof into the polymerization system; and wherein the recycle stream has a phosphorus concentration (e.g. elemental phosphorous concentration) of greater than or equal to 40, preferably greater than or equal to 50 ppm. Aspect 2: The method of Aspect 1, wherein the quaternary phosphonium catalyst comprises TBPA, preferably is TBPA.

Aspect 2: A method of preparing a polycarbonate composition in a polymerization system, the method comprising: melt polymerizing a dihydroxy compound with a diaryl carbonate compound in the presence of a quaternary phosphonium catalyst; recycling TBPO into the polymerization system; and wherein the recycle stream has a TBPO concentration of greater than or equal to 280 ppm, preferably greater than or equal to 350 ppm, such as 280 ppm to 3,500 ppm, or 280 to 1,750 ppm.

Aspect 3: A method of preparing a polycarbonate composition in a polymerization system, the method comprising: melt polymerizing a dihydroxy compound with a diaryl carbonate compound in the presence of a quaternary phosphonium catalyst; recycling phosphorus-containing byproduct into the polymerization system; and wherein the recycle stream has a phosphorus-containing byproduct concentration of greater than or equal to 280 ppm, preferably greater than or equal to 350 ppm, such as 280 ppm to 3,500 ppm, or 280 to 1,750 ppm; and wherein the phosphorus-containing byproduct comprises phosphate ester of formula:

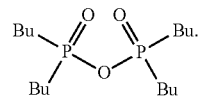

Aspect 4: The method of any one or more of the preceding aspects, wherein the quaternary phosphonium catalyst is present in amount of 10 to 500 moles of the quaternary phosphonium catalyst per total mole of the dihydroxy compound.

Aspect 5: The method of any one or more of the preceding aspects, wherein the melt polymerizing is further in the presence of an ionic catalyst, preferably wherein the ionic catalyst is of the formula (4)

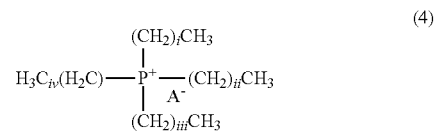

wherein i+ii+iii+iv is greater than or equal to 16, preferably 16 to 50, or 20 to 35; and wherein i is greater than or equal to ii+2 and less than or equal to ii+20.

Aspect 6: The method of any one or more of the preceding aspects, wherein the polymerization system comprises a monomer mixing unit, an oligomerization section, a polymerization section, and an extraction column that extracts phenol from the oligomerization section and returns the dihydroxy compound, the diaryl carbonate compound, or a mixture thereof, to the oligomerization section, and wherein the polymerization system further comprises a recovery system configured to recycle the phosphorus-containing byproduct of the quaternary phosphonium catalyst, or diaryl carbonate compound or a mixture thereof, to the monomer mixing unit via a byproduct stream.

Aspect 7: The method of aspect 6, wherein the byproduct stream comprises phenol, bisphenol A, diphenyl carbonate, tributyl phosphine oxide (TBPO) and phosphate esters.

Aspect 8: The method of any one or more of the preceding aspects, wherein the phosphorus-containing byproduct comprises phosphate ester of formula:

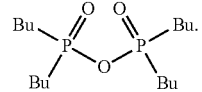

Aspect 9: The method of aspects 6 and 7, wherein the recovery system further comprises a first extraction column and a second extraction column, and wherein a top stream of the second extraction column comprises greater from 80 to 99 wt. % of DPC and from 200 to 1000 ppm wt of TBPO.

Aspect 10: The method of aspect 9, wherein DPC contains from 10 to 100 ppm, preferably 40 to 100 ppm or 50 to 90 ppm, of TBPO in the recovery system.

Aspect 11: The method of Aspects 7 to 10, wherein extracting of the phosphorus-containing byproduct of the quaternary phosphonium catalyst is by a side feed from one of the extraction columns.

Aspect 12: The method of any one or more of the preceding aspects, wherein the dihydroxy compound is a dihydroxy compound of formula (I)

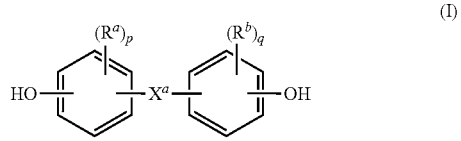
(I)

wherein $R^a$ and $R^b$ are each independently a halogen, $C_{1-12}$ alkoxy, or $C_{1-12}$ alkyl; p and q are each independently integers of 0 to 4; $X^a$ is a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group; and wherein the diaryl carbonate compound is a diaryl carbonate compound of formula (A)

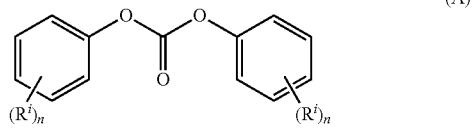
(A)

wherein each n is independently an integer of 1 to 3 and each $R^i$ is independently a linear or branched, optionally substituted $C_{1-34}$ alkyl, $C_{1-34}$ alkoxy, $C_{5-34}$ cycloalkyl, $C_{7-34}$ alkylaryl, $C_6$-34 aryl, a halogen radical, or —C(=O)OR' wherein R' is H, linear or branched $C_{1-34}$ alkyl, $C_{1-34}$ alkoxy, $C_{5-34}$ cycloalkyl, $C_{7-34}$ alkylaryl, or $C_{6-34}$ aryl.

Aspect 13: The method of any one or more of the preceding aspects, wherein the phosphorous concentration the recycle stream is 40 to 500 ppm, or 40 to 250 ppm, or 50 to 250 ppm, preferably 50 to 150 ppm, or 50 to 100 ppm, and yet or 50 to 70 ppm.

Aspect 14: The method of any one or more of the preceding aspects, wherein the quaternary phosphonium catalyst comprises TBPA, preferably is TBPA.

Aspect 15: The method of any one or more of the preceding aspects, wherein the dihydroxy compound is BPA and the diaryl carbonate compound diphenyl carbonate.

Aspect 16: A polycarbonate prepared by the method of any of the preceding aspects.

Aspect 17: An article comprising the polycarbonate composition of Aspect 16.

Aspect 18: The article of Aspect 17, wherein the article is a sheet, a film, a multilayer sheet, a multilayer film, a molded part, an extruded profile, a fiber, a coated part, or a foam.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The singular forms "a," "an," and "the" include plural referents unless the context clearly dictates otherwise. "Or" means "and/or" unless clearly indicated otherwise by context.

As used herein phosphorus content is determined using an Agilent ICP-MS (Inductively Coupled Plasma Mass Spectrometry) 7700E model with Helium Mode Collision Reaction Cell. SeaSpray nebulizer was used in all the measurements. The software that was used to interpret ICP-MS response was ICP MassHunter™ Workstation Software.

The terms "bottom", or "top" are used herein, unless otherwise noted, merely for convenience of description, and are not limited to any one position or spatial orientation. The terms "first," "second," and the like, "primary," "secondary," and the like, as used herein do not denote any order, quantity, or importance, but rather are used to distinguish one element from another.

The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group.

The suffix "(s)" is intended to include both the singular and the plural of the term that it modifies, thereby including at least one of that term (e.g., the colorant(s) includes at least one colorants). "Optional" or "optionally" means that the subsequently described event or circumstance may or may not occur, and that the description includes instances where the event occurs and instances where it does not.

The term "commercial scale", as used herein, means a scaled-up industrial process for a polycarbonate production process (e.g., the polycarbonate production industrial process that can produce about 16,800 kilograms of the polycarbonate per hour) put into place in industrial facilities where the process was originally developed at a laboratory scale.

Unless defined otherwise, technical and scientific terms used herein have the same meaning as is commonly understood by one of skill in the art to which this disclosure belongs. A "combination" is inclusive of blends, mixtures, alloys, reaction products, and the like.

Unless specified to the contrary herein, all test standards, such as ASTM, ISO, etc., are the most recent standard in effect as of Dec. 5, 2018.

All cited patents, patent applications (including any patent application to which this application claims priority), and other references are incorporated herein by reference in their entirety. However, if a term in the present application contradicts or conflicts with a term in the incorporated reference, the term from the present application takes precedence over the conflicting term from the incorporated reference.

While typical embodiments and aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method of preparing a polycarbonate composition in a polymerization system, wherein the polymerization system comprises a monomer mixing unit, the method comprising:
   melt polymerizing a dihydroxy compound with a diaryl carbonate compound in the presence of a quaternary phosphonium catalyst to produce the polycarbonate composition comprising a phosphorus-containing byproduct of at least one of the quaternary phosphonium catalyst or of the diaryl carbonate compound;
   recycling a recycle stream comprising the phosphorus-containing byproduct into the monomer mixing unit of the polymerization system; and removing the polycarbonate composition from the polymerization system;
wherein the recycle stream has a phosphorus concentration of greater than or equal to 40 parts per million by weight.

2. The method of claim 1, wherein the phosphorus-containing byproduct comprises phosphate ester of formula:

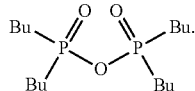

3. A method of preparing a polycarbonate composition in a polymerization system, the method comprising:
melt polymerizing a dihydroxy compound with a diaryl carbonate compound in the presence of a quaternary phosphonium catalyst;
recycling phosphorus-containing byproduct into the polymerization system; and wherein the recycle stream has a phosphorus-containing byproduct concentration of greater than or equal to 280 ppm; and
wherein the phosphorus-containing byproduct comprises phosphate ester of formula:

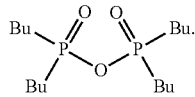

4. The method of claim 1, wherein the quaternary phosphonium catalyst comprises tetrabutyl phosphonium acetate.

5. The method of claim 1, wherein the dihydroxy compound is bisphenol A and the diaryl carbonate compound is diphenyl carbonate.

6. The method of claim 1, wherein the quaternary phosphonium catalyst is present in amount of 5 to 500 moles of the quaternary phosphonium catalyst per total mole of the dihydroxy compound.

7. The method of claim 1, wherein the melt polymerizing is further in the presence of an ionic catalyst.

8. The method of claim 1, wherein the polymerization system further comprises an extraction column that extracts phenol from the oligomerization section and returns at least one of the dihydroxy compound or the diaryl carbonate compound to the oligomerization section.

9. The method of claim 8, wherein the recycle stream comprises phenol, bisphenol A, diphenyl carbonate, tributyl phosphine oxide, and phosphate esters.

10. The method of claim 8, wherein the recovery system further comprises a first extraction column and a second extraction column, and wherein a top stream of the second extraction column comprises from 80 to 99 wt. % of diphenyl carbonate and from 200 to 1000 ppm of tributyl phosphine oxide.

11. The method of claim 9, wherein the diphenyl carbonate contains from 10 to 100 ppm of tributyl phosphine oxide in the recovery system.

12. The method of claim 8, wherein extracting of the phosphorus-containing byproduct of the quaternary phosphonium catalyst is by a side draw from at least one of the first extraction column and the second extraction column.

13. The method of claim 1, wherein the recycle stream has a phosphorus concentration of 40 to 150 ppm.

14. The method of claim 1, wherein the phosphorous concentration the recycle stream is 40 to 500 ppm.

15. The method of claim 1, wherein the phosphorous concentration the recycle stream is greater than or equal to 50 ppm.

16. A polycarbonate prepared by the method claim 1.

17. An article comprising the polycarbonate of claim 16.

18. The article of claim 17, wherein the article is a sheet, a film, a multilayer sheet, a multilayer film, a molded part, an extruded profile, a fiber, a coated part, or a foam.

19. The method of claim 1, wherein the recycle stream has a phosphorus concentration of greater than or equal to 50 parts per million by weight.

20. The method of claim 3, wherein the recycle stream has a phosphorus-containing byproduct concentration of greater than or equal to 350 parts per million by weight.

21. The method of claim 1, wherein
the polymerization system further comprises an oligomerization section and a polymerization section; and
the melt polymerizing comprises converting the dihydroxy compound and the diaryl carbonate compound into an oligomer in the oligomerization section and converting the oligomer to the polycarbonate composition in the polymerization section.

* * * * *